W. A. CATES.
Geographical Clock.

No. 197,246. Patented Nov. 20, 1877.

WITNESSES:
C. Neveux
J. H. Scarborough

INVENTOR:
W. A. Cates.
BY Munn & Co.
ATTORNEYS.

UNITED STATES PATENT OFFICE.

WILLIAM A. CATES, OF UNION, OREGON, ASSIGNOR OF ONE-HALF HIS RIGHT TO R. S. CATES, OF SAME PLACE.

IMPROVEMENT IN GEOGRAPHICAL CLOCKS.

Specification forming part of Letters Patent No. 197,246, dated November 20, 1877; application filed August 24, 1877.

*To all whom it may concern:*

Figure 1:
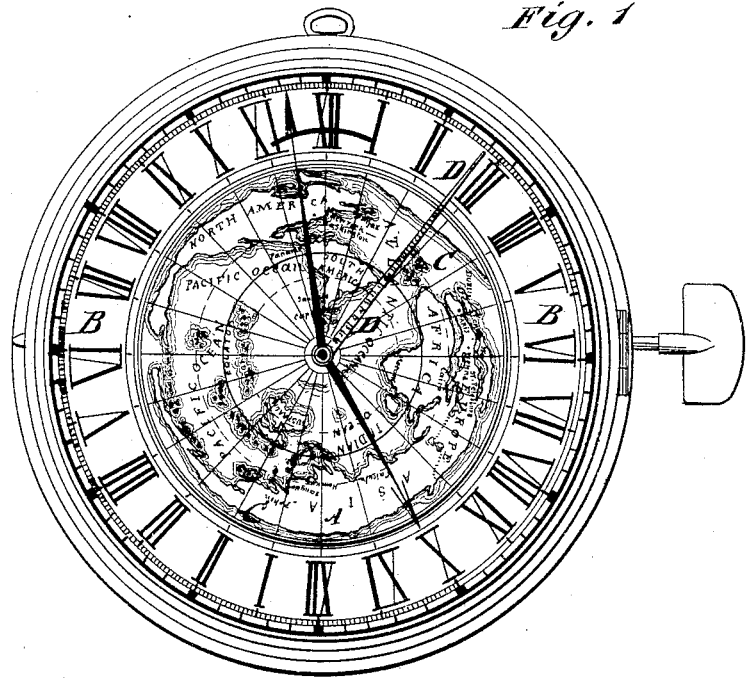
Figure 2:
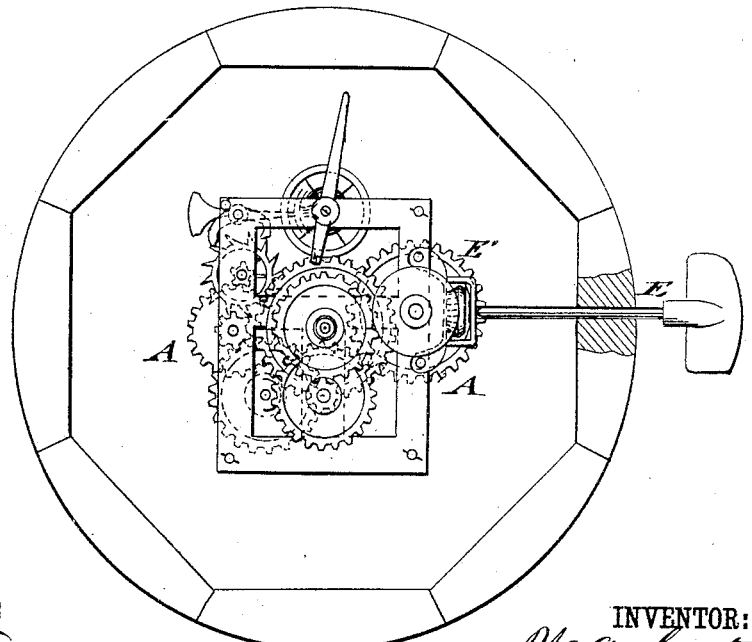

Be it known that I, WILLIAM A. CATES, of Union, in the county of Union and State of Oregon, have invented a new and Improved Universal Time-Piece, of which the following is a specification:

In the accompanying drawings, Figure 1 represents a front view of my improved universal time-piece, and Fig. 2 a front view of the same with dial and face-plate detached.

Similar letters of reference indicate corresponding parts.

The object of this invention is to furnish an improved time-piece for the purpose of readily ascertaining the time at any place on the earth, and also for teaching geography by clock-work in schools, as thereby the different countries and their relative location to each other, together with the revolution of the earth on its axis, are fully understood and impressed on the mind.

The invention consists of a clock with a dial which is so subdivided as to indicate the twenty-four hours of the day, and arranged with a revolving face-plate, having a map of the earth on a polar projection, the face-plate being placed on the hub of the hour-hand.

A loosely-moving and graduated index-hand is placed on the hub of the hour-wheel, for indicating the time and geographical location of any place on the surface of the earth.

In the drawings, A represents a clock-train of the usual construction, and B the dial of the same, which is not numbered in the customary manner from one to twelve, but divided into twenty-four parts, and numbered from one to twelve A. M. and from one to twelve P. M., so that there will be no confusion in noting time in the usual manner. To have the hands correspond to this dial, it is necessary to make a change in the motion of the hour-hand by decreasing the speed of the same one-half, which is accomplished by a change in the dimensions of the train of gear-wheels, while the speed of the minute-hand remains unchanged.

Inside of the numbered dial B is a disk-shaped face-plate, C, which is attached to the hub of the hour-hand, but so that it may be moved independently of the same, if desired.

The face-plate C is provided with a map of the world on a polar projection, in such a manner that the center of the map represents the south pole, and the margin the north pole. The equator and degrees of northern and southern latitude are indicated by circles concentric to the south pole. The face-plate is divided by radial lines into twenty-four parts, each of fifteen degrees of longitude, which may be reckoned from Greenwich, Washington, or any other place, as desired.

The general outlines of the earth are, of course, very much distorted; but as the prominent cities and places are entered in correct geographical position according to the longitudes and latitudes, the difference in time and their relative geographical positions to each may readily and correctly be ascertained.

The face-plate C revolves with the hub of the hour-hand, but may also be moved thereon, so that the hour-hand may be set to any desired longitude, in order to mark the time.

For teaching geography in schools, the dials and the map of the world on the face-plate are executed on a larger scale, and all the political divisions represented thereon. The map has the advantage that it shows to the pupil the connection of the continents and the location of the different countries in clearer manner than when the northern and southern or eastern and western hemispheres are disconnected. As the map revolves with the hour-hand, it is also illustrative of the revolution of the earth on its axis, which it impresses, together with the difference of time at different points of the earth, more clearly to the mind of the pupil, so that he is desirous of learning more about the earth.

An index-hand, D, is placed on the hub of the hour-wheel, and made to turn readily thereon. It is graduated with the degrees of latitude, running from zero at the center to ninety degrees at both ends, so as to indicate thereby the degrees of northern and southern latitude.

To find the time at any place on the earth, the index-hand is either moved forward or backward to the desired place. Then if the number of degrees past the hour to which it points be multiplied by four the product will the number of minutes past the hour indicated. The index-hand serves at the same time to indicate the longitude and latitude of the place, the one by the graduation of the face-plate to which it points, the other by the graduation of the index-hand.

The clock-train is wound up by a stationary or detachable winding shaft or key, E, that works by a fixed pinion, a bevel-wheel, E', attached to the winding-shaft, so that the clock may be wound at any time from the side instead of from the face. The key or shaft is extended to the outside of the clock and provided with a thumb-piece for taking hold of the same. This style of winding up the clock-train and striking-gear is more convenient when large dials and maps are used, and the shaft which serves as a key merely lengthened to suit the size of the time-piece.

Thus an ornamental and useful time-piece, for schools and other purposes, that indicates the correct time at any point of the earth, and gives a general knowledge of geography, is provided at a comparatively low cost, on account of its simple construction.

The face-plate may also be so divided as to be used in twelve-hour clocks, in which case, however, only one hundred and eighty degrees of longitude may be covered on the map of the face-plate, which may be reckoned ninety degrees east and west of the meridian of Washington, so as to cover the principal business.

Having thus described my invention, I claim as new and desire to secure by Letters Patent—

A universal time-piece, whose panoramic map or face-plate revolves, is divided into twenty-four hours as well as three hundred sixty degrees, and is provided with an index adjustable on the hub of hour-wheel independently of hour-hand, as and for the purpose specified.

WILLIAM ASRO CATES.

Witnesses:
E. L. ECKLEY,
S. W. SWACKHAMER.